(12) United States Patent
Walster

(10) Patent No.: US 6,728,953 B1
(45) Date of Patent: Apr. 27, 2004

(54) SELECTIVELY ENABLING EXPRESSION FOLDING DURING PROGRAM COMPILATION

(75) Inventor: G. William Walster, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 09/703,413

(22) Filed: Oct. 31, 2000

Related U.S. Application Data

(60) Provisional application No. 60/211,455, filed on Jun. 13, 2000, and provisional application No. 60/163,372, filed on Nov. 3, 1999.

(51) Int. Cl.$^7$ ................................................. G06F 9/45
(52) U.S. Cl. ...................................... 717/151; 717/140
(58) Field of Search .......................... 717/140, 151–161

(56) References Cited

PUBLICATIONS

Mathematica Book, "MATLAB Compiler: mcc", 1998, http://www.mathworks.com/access/helpdesk_r12p1/help/toolbox/compiler/appaquic.shtml, Mathworks.com, ed. 4.*
Wolfram, Stephan, "Mathematica Book: Legacy and Copywrite for Mathematica Book", 1998, http://documents.wolfram.com/legacy.html, Wolfram Research, "Notes on the Various Editions of the Mathematica Book".*
Wolfram, Stephen, "Mathematica Book: 2.4.8 Immediate and Delayed Definitions", 1998, http://documents.wolfram.com/v4/MainBook/0.2.1.html, Wolfram Research, sec. 2.4.8.*
Wolfram, Stephen, "Mathematica Book: 3.1.7 Advanced Topic: Interval Arithmetic", 1998, http://documents.wolfram.com/v4/MainBooks/3.1.7.html, Wolfram Research, sec. 3.1.7.*
Wolfram, Stephen, "Mathematica Book: 2.6.4 Advanced Topic: Variables in Pure Functions and Rules", 1998, http://documents.wolfram.com/v4/MainBook/2.6.4.html, Wolfram Research, sec 2.6.4.*
Aho, Alfred et al., "Compilers: Principles, Techniques, and Tools", Addison–Wesley, ed. 2, p. 4–8.*

* cited by examiner

*Primary Examiner*—Wei Y. Zhen
(74) *Attorney, Agent, or Firm*—Park, Vaughan & Fleming LLP

(57) ABSTRACT

A system is presented that selectively enables expression folding during compilation of a program, wherein the compilation converts the program from source code into executable code. The system operates by forming an expression tree for an expression within the source code which includes an assignment operator. If the assignment operator is a first assignment operator that is a value assignment, only the computed value can be used in subsequent expressions, thereby disabling expression folding during the compilation process. On the other hand, if the assignment operator is a second assignment operator that specifies an expression assignment, the entire expression can be used in place of the variable on the left of the expression assignment, thereby enabling expression folding during the compilation process. The expression can include a mathematical interval. The expression folding can involve substituting a first expression for a variable within a second expression, and then simplifying the result.

21 Claims, 5 Drawing Sheets

$X \equiv [\underline{x}, \bar{x}] \equiv \{x \in \Re | \underline{x} \leq x \leq \bar{x}\}$ $Y \equiv [\underline{y}, \bar{y}] \equiv \{y \in \Re | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [min(\downarrow \underline{x} \times \underline{y}, \underline{x} \times \bar{y}, \bar{x} \times \underline{y}, \bar{x} \times \bar{y}), max(\uparrow \underline{x} \times \underline{y}, \underline{x} \times \bar{y}, \bar{x} \times \underline{y}, \bar{x} \times \bar{y})]$ (4) $X / Y = [min(\downarrow \underline{x}/\underline{y}, \underline{x}/\bar{y}, \bar{x}/\underline{y}, \bar{x}/\bar{y}), max(\uparrow \underline{x}/\underline{y}, \underline{x}/\bar{y}, \bar{x}/\underline{y}, \bar{x}/\bar{y})], if\ 0 \notin Y$ $X / Y = \Re^*, if\ 0 \in Y$

FIG. 5

SELECTIVELY ENABLING EXPRESSION FOLDING DURING PROGRAM COMPILATION

RELATED APPLICATION

The application hereby claims priority under 35 U.S.C. §119 to U.S. Provisional Patent Application No. 60/163,372 filed on Nov. 3, 1999, and to U.S. Provisional Patent Application No. 60/211,455 filed on Jun. 13, 2000.

BACKGROUND

1. Field of the Invention

The present invention relates to compilers for programming languages. More specifically, the present invention relates to a method and an apparatus for selectively enabling expression folding during the compilation process by using a first assignment operator to specify an expression assignment and a second assignment operator to specify a value assignment.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions. (Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers.)

However, computer systems are presently not designed to efficiently handle intervals and interval computations. Consequently, performing interval operations on a typical computer system can be hundreds of times slower than performing conventional floating-point operations. In addition, without a special representation for intervals, interval arithmetic operations fail to produce results that are as narrow as possible.

What is needed is a method and an apparatus for efficiently performing arithmetic operations on intervals with results that are as narrow as possible. (Interval results that are as narrow as possible are said to be "sharp".)

One problem in performing interval computations arises from optimizations that are often performed during the compilation process. One common optimization is "expression folding," in which a first expression is substituted for a variable within a second expression and the resulting second expression is simplified. For example, if a program includes the instruction X=A+B, followed by the instruction Z=X−A, some compilers will substitute A+B for X in the expression for Z and will simplify, Z=(A+B)−A=B. As can be seen from this simple example, expression folding can potentially eliminate unnecessary computational operations.

However, expression folding can also create problems, especially for interval computations. For example, suppose a program must compute the summation of a number of intervals $x_i$.

$$X = \sum_{i=1}^{n} x_i$$

Next, suppose that the program subsequently computes $Y_j = X - x_j$. If the compiler performs expression folding by substituting the summation for X, and then simplifies to eliminate $x_j$, the program ends up computing the following partial sum.

$$Y_j = \sum_{\substack{i=1 \\ i \neq j}}^{n} x_i$$

Note that computing this partial sum is much slower than simply computing $Y_j = X - x_j$, which simply involves performing a single subtraction operation. Hence, when possible, it is desirable not to use expression folding. However, note that if $x_j \gg Y_j$, expression folding prevents rounding errors caused by a large $x_j$ from undermining the accuracy of $Y_j$. In this case it is desirable to use expression folding.

Hence, what is needed is a method and an apparatus that facilitates expression folding in cases where expression folding is advantageous, and that facilitates disabling expression folding in cases where expression folding is not advantageous.

SUMMARY

One embodiment of the present invention provides a system that selectively enables expression folding during compilation of a program, wherein the compilation converts the program from source code into executable code. The system operates by forming an expression tree for an expression within the source code which includes an assignment operator. If the assignment operator is a first assignment operator that is a value assignment, only the computed value can be used in subsequent expressions, thereby disabling expression folding during the compilation process. On the other hand, if the assignment operator is a second assignment operator that specifies an expression assignment, the entire expression can be used in place of the variable on the left of the expression assignment, thereby enabling expression folding during the compilation process.

In one embodiment of the present invention, the expression includes a mathematical interval.

In one embodiment of the present invention, the expression folding involves substituting of a first expression for a variable within a second expression, and then simplifying the resulting second expression through mathematically-equivalent symbolic manipulation.

In one embodiment of the present invention, the first assignment operator is represented as ":=" within the source code.

In one embodiment of the present invention, the second assignment operator is represented as "=" within the source code.

In one embodiment of the present invention, if the assignment operator is an expression assignment operator, expression folding is required if the expression on the right-hand-side of the expression assignment operator contains a non-degenerate literal interval constant.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. For example, in different computer languages, different symbols may be more appropriate to distinguish the value and expression assignment operators. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
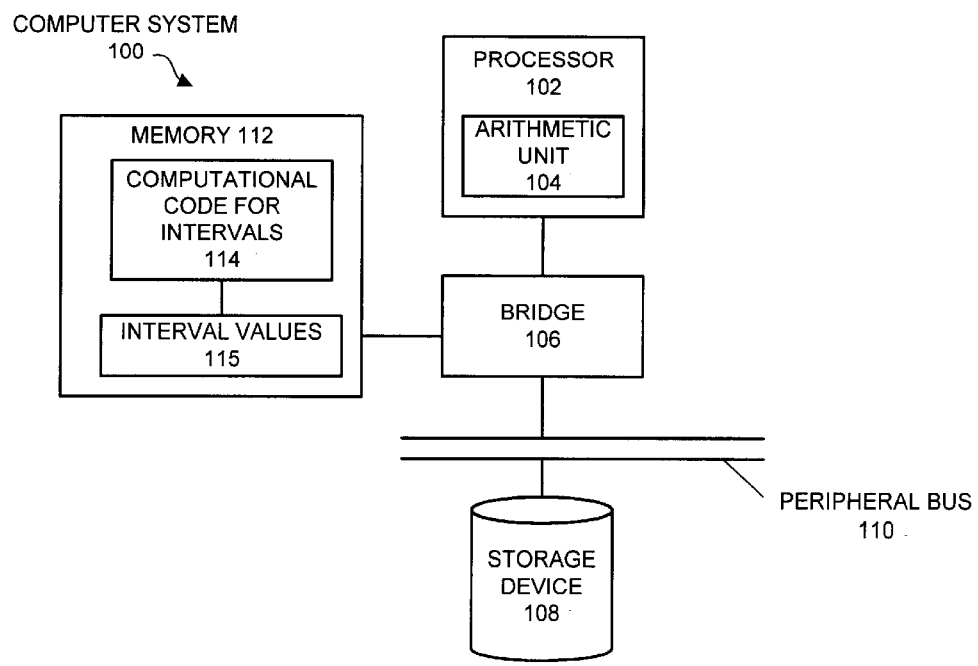
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
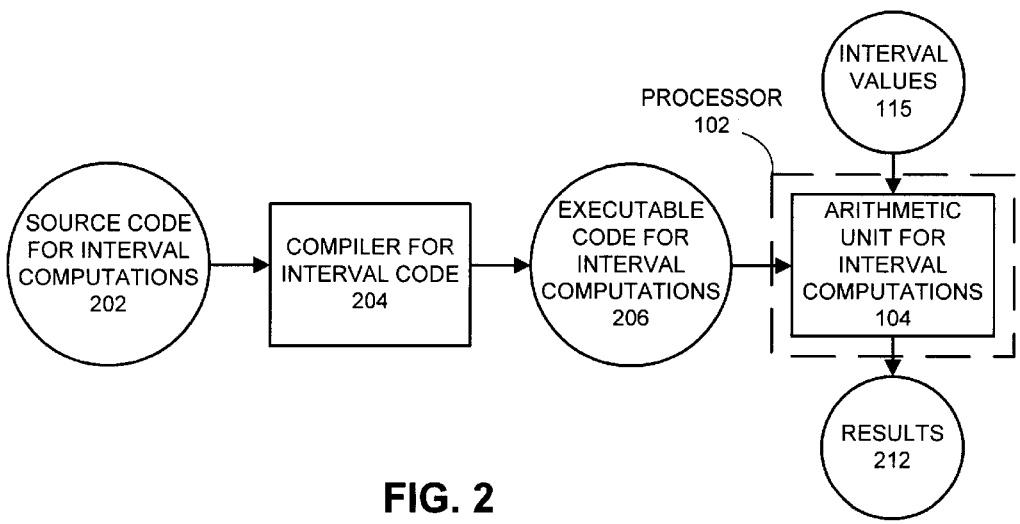
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
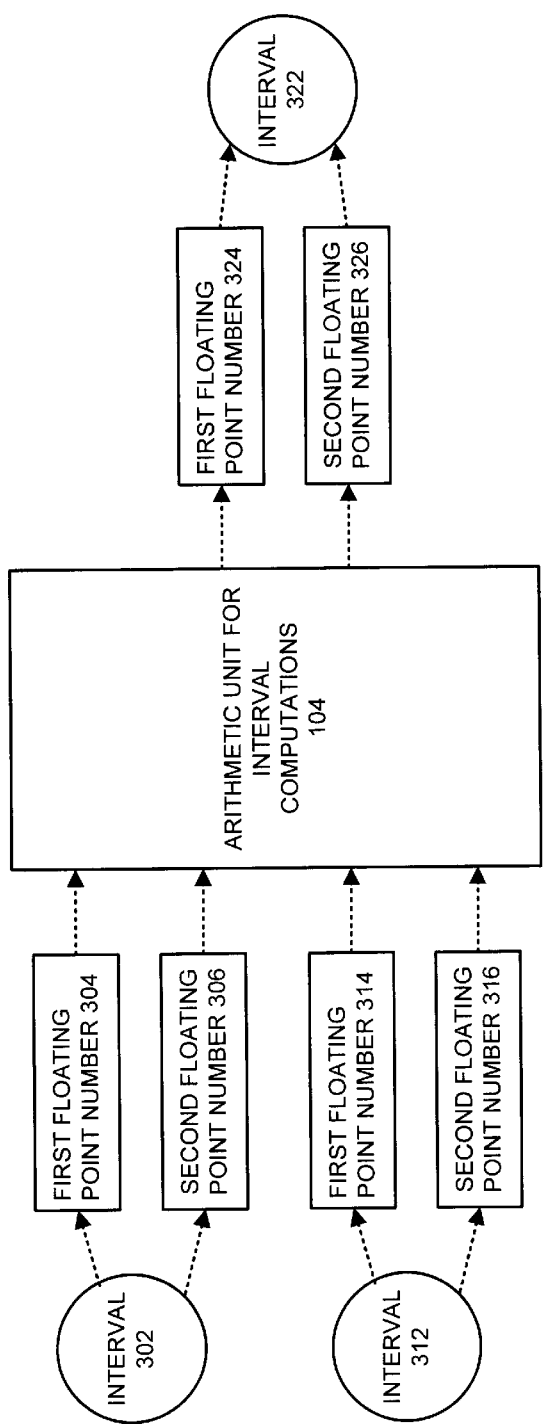
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. patent application Ser. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
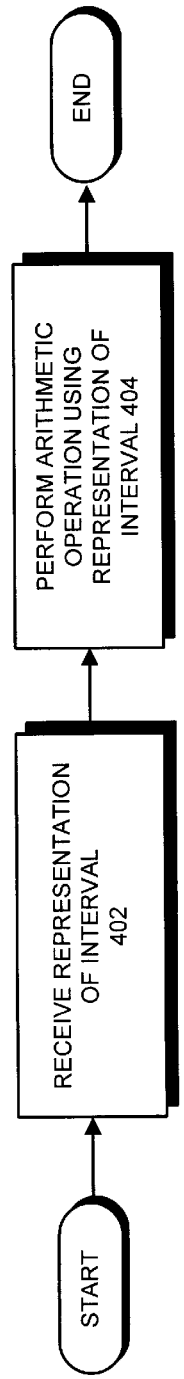
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed, bounded subset of the real numbers R (see line 1 of FIG. 5). Similarly the interval Y also has two endpoints and is a closed, bounded subset of the real numbers R (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points minus infinity and plus infinity:

$$R * R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Compiler for Interval Code

Figure 6:
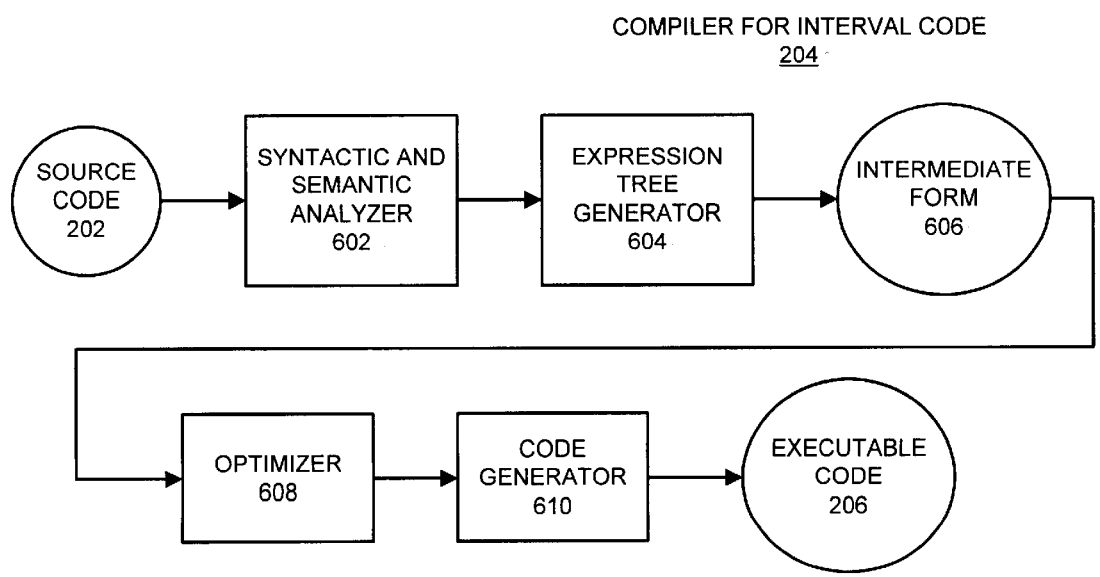
FIG. 6 illustrates a compiler for interval code in accordance with an embodiment of the present invention.

FIG. 6 illustrates the internal structure of the compiler 204 for interval code from FIG. 2 in accordance with an embodiment of the present invention. Compiler 204 includes a number of components, including syntactic and semantic analyzer 602, expression tree generator 604, optimizer 608 and code generator 610.

Compiler 204 receives source code 202 and passes it through syntactic and semantic analyzer 602 to determine whether or not source code 202 adheres to the rules of the programming language in which it is written. If not, the system outputs an error message.

Next, source code 202 is passed through expression tree generator 604, which converts source code 202 into intermediate form 606. This intermediate form 606 includes expression trees as is described below with reference to FIGS. 7 and 8A–E.

Intermediate form 606 then passes through optimizer 608, which makes performance-improving transformations on the code.

Finally, the output of optimizer 608 passes through code generator 610, which produces executable code 206. Executable code 206 can include code that is written in a native instruction set, as well as platform-independent instructions, such as bytecodes defined in the JAVA™ programming language. (Sun, the Sun logo, Sun Microsystems, and Java are trademarks or registered trademarks of Sun Microsystems, Inc. in the United States and other countries.)

Process of Selectively Enabling Expression Folding

Figure 7:
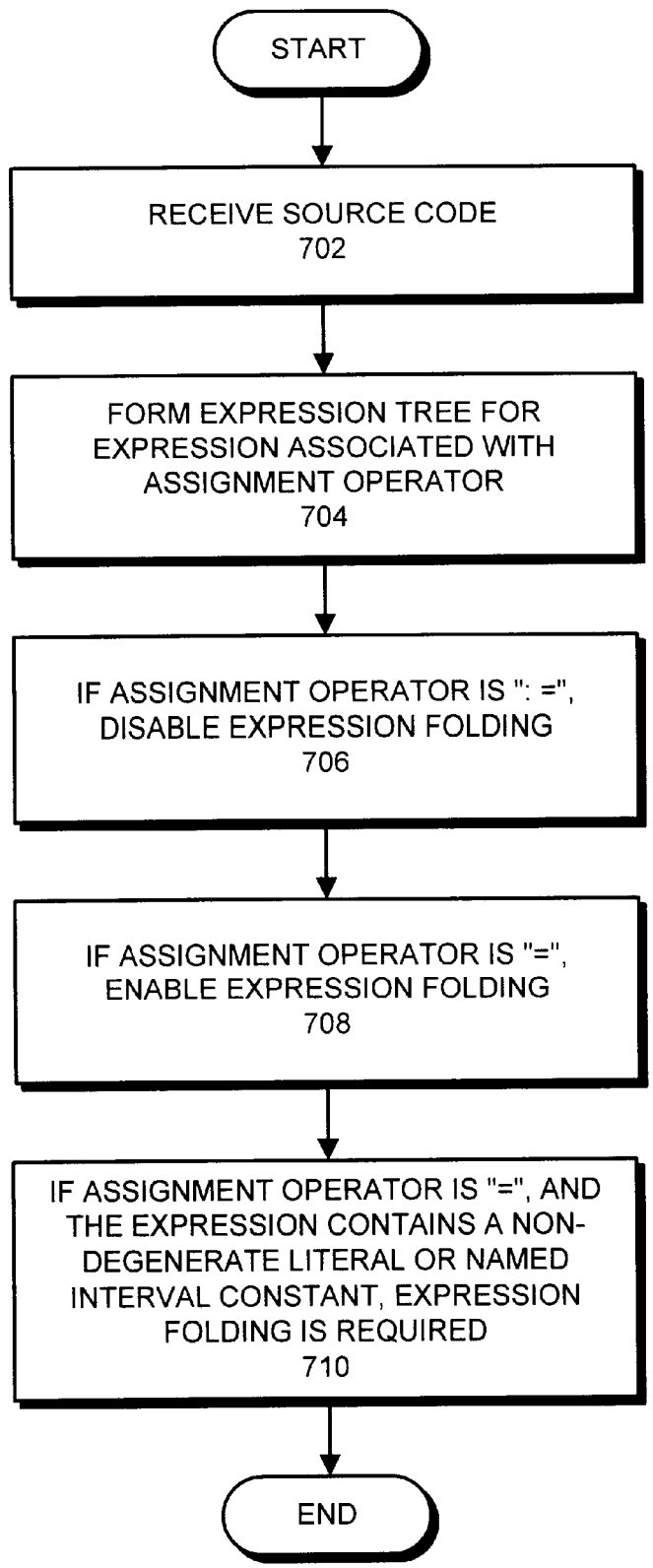
FIG. 7 is a flow chart illustrating how different assignment operators are used to selectively enable expression folding in accordance with an embodiment of the present invention.

FIG. 7 is a flow chart illustrating how different assignment operators are used to selectively enable expression folding in accordance with an embodiment of the present invention. Compiler 204 first receives source code 202 (see FIG. 2) (step 702). Next, after syntactic and semantic analyses take place, expression tree generator 604 generates expression trees for statements within source code 202 (see FIG. 6). This expression tree generation process includes forming an expression tree for a given expression associated with a given assignment operator (step 704).

If the given assignment operator specifies a value assignment, the system disables expression folding for the given expression during the compilation process (step 706). On the other hand, if the given assignment operator specifies an expression assignment, the system enables expression folding for the given expression (step 708).

In one embodiment of the present invention, the "=" symbol is used to represent an expression assignment. This usage is compatible with existing compilers, which typically uses the "=" symbol to denote an assignment operation, and which typically allow expression folding for all assignment operations under high levels of performance optimization.

In one embodiment of the present invention, ":=" is used to represent a value assignment. Although ":=" is a convenient representation, any symbol or string that is not reserved for other purposes within a programming language can be used instead of":=".

Note that in an interval context, a value assignment, such as X:=[1,2] disallows substitution of the constant expression, [1,2]. In this case, if there are two instances of the variable, X, each instance is associated with the same underlying point variable. Hence, Z=X−X=0.

In contrast, an expression assignment, X=[1,2], forces expression substitution. In this case, since X is a placeholder for the constant [1,2], if there are two instances of X, each instance is associated with the same interval constant [1,2]. Hence, Z=X−X=[1,2]−[1-2]=[−1,1].

In another embodiment of the present invention, the two different assignment operators are used within PARAMETER statements in a version of FORTRAN 90 programming language that has been augmented to include the two different assignment operators. In this embodiment, the expression assignment operator, "=", defines a named constant. In this case, "PARAMETER X=[1,2]" indicates that [1,2] must be substituted for all occurrences of X.

In contrast, the value assignment operator, ":=" defines a read-only variable. In this case, "PARAMETER X:=[1,2]" indicates that the read-only variable X can be symbolically manipulated by the compiler because multiple occurrences of the interval variable, X, are dependent.

In another example, suppose we have the expression assignment Y=X+[−1,1]. In this case, Z=Y−Y=X+[−1,1]−X−[−1,1]=[−2,2], because X is an interval variable and [−1,1] is an interval constant.

On the other hand, suppose we have the value assignment Y:=X+[−1,1]. In this case, Z=Y−Y=[0,0], because every occurrence of the variable, Y, depends on the same underlying point variable.

The last example illustrates the fact that expression folding is required after expression assignments if the expression contains non-degenerate literal or named interval constants (step 710).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively enabling expression folding during compilation of a program, wherein the compilation converts the program from source code into executable code, comprising:

receiving the source code at a compiler;

forming an expression tree for an expression within the source code that includes an assignment operator; and if the assignment operator is a first assignment operator that specifies a value assignment, disabling expression folding during the compilation process;

wherein the executable code is executed in an arithmetic unit that is optimized for interval arithmetic.

2. The method of claim 1, wherein if the assignment operator is a second assignment operator that specifies an expression assignment, enabling expression folding during the compilation process.

3. The method of claim 1, wherein the expression includes a mathematical interval.

4. The method of claim 1, wherein the expression folding involves:

substituting a first expression for a variable within a second expression; and simplifying the resulting second expression through mathematically-equivalent symbolic manipulation.

5. The method of claim 1, wherein the first assignment operator is represented as ":=" within the source code.

6. The method of claim 2, wherein the second assignment operator is represented as "=" within the source code.

7. The method of claim 1, wherein if the assignment operator is an expression assignment operator, expression folding is required if the expression on the right-hand-side of the expression assignment operator contains a non-degenerate literal or named interval constant.

8. A computer-readable storage medium storing instructions that when executed by a computer cause the computer to perform a method for selectively enabling expression folding during compilation of a program, wherein the compilation converts the program from source code into executable code, the method comprising:

receiving the source code at a compiler;

forming an expression tree for an expression within the source code that includes an assignment operator; and if the assignment operator is a first assignment operator that specifies a value assignment, disabling expression folding during the compilation process;

wherein the executable code is executed in an arithmetic unit that is optimized for interval arithmetic.

9. The computer-readable storage medium of claim 8, wherein if the assignment operator is a second assignment operator that specifies an expression assignment, enabling expression folding during the compilation process.

10. The computer-readable storage medium of claim 9, wherein the second assignment operator is represented as "=" within the source code.

11. The computer-readable storage medium of claim 8, wherein the expression includes a mathematical interval.

12. The computer-readable storage medium of claim 8, wherein the expression folding involves:

substituting a first expression for a variable within a second expression; and simplifying the resulting second expression through mathematically-equivalent symbolic manipulation.

13. The computer-readable storage medium of claim 8, wherein the first assignment operator is represented as ":=" within the source code.

14. The computer-readable storage medium of claim 8, wherein if the assignment operator is an expression assignment operator, expression folding is required if the expression on the right-hand-side of the expression assignment operator contains a non-degenerate literal or named interval constant.

15. A compiler that selectively enables expression folding during compilation of a program, wherein the compiler converts the program from source code into executable code, comprising:

an expression tree forming mechanism that is configured to form an expression tree for an expression within the source code that includes an assignment operator; and an expression folding mechanism;

wherein if the assignment operator is a first assignment operator that specifies a value assignment, the expression folding mechanism is configured to disable expression folding during the compilation process; and wherein the executable code is executed in an arithmetic unit that is optimized for interval arithmetic.

16. The compiler of claim 15, wherein if the assignment operator is a second assignment operator that specifies an expression assignment, the expression folding mechanism is configured to enable expression folding during the compilation process.

17. The compiler of claim 16, wherein the second assignment operator is represented as "=" within the source code.

18. The compiler of claim 15, wherein the expression includes a mathematical interval.

19. The compiler of claim 15, wherein the expression folding mechanism is configured to:

substitute a first expression for a variable within a second expression; and to simplify the resulting second expression through mathematically-equivalent symbolic manipulation.

20. The compiler of claim 15, wherein the first assignment operator is represented as ":=" within the source code.

21. The compiler of claim 15, wherein if the assignment operator is an expression assignment operator, the expression folding mechanism is configured to require expression folding if the expression on the right-hand-side of the expression assignment operator contains a non-degenerate literal or named interval constant.

\* \* \* \* \*